United States Patent

Yamamoto

[11] Patent Number: 5,595,539
[45] Date of Patent: Jan. 21, 1997

[54] VISCOUS VIBRATION DAMPING MECHANISM WITH VARIABLE FLUID FLOW RESISTANCE

[75] Inventor: Kozo Yamamoto, Daitou, Japan

[73] Assignee: Exedy Corporation, Osaka, Japan

[21] Appl. No.: 263,886

[22] Filed: Jun. 22, 1994

[30] Foreign Application Priority Data

Jun. 24, 1993 [JP] Japan ...................... 5-153490

[51] Int. Cl.$^6$ ...................................... F16D 3/80
[52] U.S. Cl. .............. 464/24; 192/208; 464/66; 464/68
[58] Field of Search ................ 464/68, 24, 64, 464/65, 66, 62, 67, 73, 7; 74/574; 192/106.2, 208

[56] References Cited

U.S. PATENT DOCUMENTS

| | | |
|---|---|---|
| 4,351,167 | 9/1982 | Hanke et al. . |
| 4,739,866 | 4/1988 | Reik et al. . |
| 4,944,712 | 7/1990 | Wörner et al. . |
| 5,030,166 | 7/1991 | Wörner et al. . |
| 5,052,978 | 10/1991 | Hanke . |
| 5,072,818 | 12/1991 | Kuhne . |
| 5,097,722 | 3/1992 | Fukushima . |
| 5,103,688 | 4/1992 | Kuhne ........................ 74/574 |
| 5,180,044 | 1/1993 | Fukushima et al. . |
| 5,194,045 | 3/1993 | Hanke . |
| 5,249,659 | 10/1993 | Fukushima ................ 74/574 X |
| 5,353,664 | 10/1994 | Yamamoto ................ 74/574 X |
| 5,355,747 | 10/1994 | Kajitani et al. . |

FOREIGN PATENT DOCUMENTS

| | | | |
|---|---|---|---|
| 194433 | 7/1992 | Japan . | |
| 5133439 | 5/1993 | Japan ........................ | 74/574 |
| 2137309 | 10/1984 | United Kingdom ........... | 464/66 |

Primary Examiner—Daniel P. Stodola
Assistant Examiner—William A. Rivera
Attorney, Agent, or Firm—Shinjyu Office of Patent Attorneys

[57] ABSTRACT

A fluid viscous damper mechanism (4) used in a flywheel assembly includes a first flywheel (1) and a second flywheel (3) which are connected for limited rotary displacement therebetween. The displacement of the two flywheels is defined within a first displacement range and a second displacement range, where the second range is greater than the first range. The flywheels form therebetween a plurality of fluid flow chambers. Disposed between a first and a second of the flow chambers is a sub-choke (S1). Disposed between a third and a fourth of the flow chambers is a main choke (S2). In one embodiment, the sub-choke (S1) produces a predetermined fluid flow resistance force in response to displacement between the flywheels in the first displacement range. The main choke (S2) produces a gradually increasing fluid flow resistance force in response to displacement between the flywheels in the second displacement range. In a second embodiment, the first choke (S1) produces a gradually increasing resistance force in response to displacement of the flywheels in the first range, and the second choke (S2) produces a generally constant fluid flow resistance force in response to rotary displacement between the flywheels in the second displacement range.

3 Claims, 10 Drawing Sheets

VISCOUS VIBRATION DAMPING MECHANISM WITH VARIABLE FLUID FLOW RESISTANCE

BACKGROUND OF THE INVENTION

The present invention relates generally to a torsional vibration damping device used generally in a flywheel assembly. More particularly, the present invention relates to a viscous torsional vibration damping device having variable dampening means responsive to relative rotary displacement of a first flywheel of a flywheel assembly and an output rotation member which are connected to each other for limited rotary displacement.

A viscous torsional vibration damping device damps torsional vibration utilizing a resistance force produced when viscous fluid passes through a choke or the like, and is used, for example, in a flywheel between the engine of an automobile and a clutch disc assembly. When a viscous torsional vibration damping device is used in a flywheel, the flywheel is typically divided into two flywheels, and the viscous torsional vibration damping device is disposed between the two flywheels.

In a viscous torsional vibration damping device, it is desirable to vary the resistance force caused by the passage of viscous fluid in the dampening device in response to the operating conditions so as to effectively damp the torsional vibration in a wide operating regions. A small resistance force is desirable in damping small torsional vibration such as the vibrations associated with idling of an internal combustion engine. A large resistance force is effective in damping low-frequency vibration caused by rapidly pressing down the accelerator or releasing the accelerator quickly. Therefore, a conventional viscous torsional vibration damping device include a first damping part for producing a small resistance force in a range of small displacement angle between the first flywheel and the second flywheel and a second damping part for producing a large resistance force in a range of large displacement angle therebetween.

In the above described torsional vibration damping device, there are two levels of damping resistance force. The resistance force in the first damping part is small so as to absorb vibration at the time of idling, for example. On the other hand, the resistance force in the second damping part is large so as to considerably absorb the low-frequency vibration. However, when vibrations in the flywheel system are such that the relative displacement of the two displaceable parts causes fluctuates between the two levels of resistance force, the fluctuations produce a shock, thus limiting the effectiveness of the damping device.

SUMMARY OF THE INVENTION

A viscous torsional vibration damping device according to a first embodiment of the present invention includes an input rotation member and an output rotation member which are connected to each other for limited rotational displacement with respect to one another. The angle of relative rotational displacement between the two members is defined in a first displacement range and a second displacement range where the possible angular displacement within the second range is greater than displacement possible in the first range.

Disposed between the input and output rotation members are a plurality of fluid filled chambers. Fluid flows between the chambers in response to rotational displacement between the two members. Between a first and second chamber is a first damping part. Between a third and a forth chamber is a second damping part. The first damping part produces a predetermined resistance force against the flow of fluid between the first two fluid filled chambers in the first displacement range. The second damping part produces an increasing resistance force against fluid flow between the third and fourth chambers as the relative displacement angle increases within the second range.

The resistance force produced by the second damping part is set so as to be close to the first resistance force at the point where the displacement angle becomes large, leaves the first range and enters the second range. The resistance force produced by the second damping part gradually increases as the displacement angle becomes larger. Consequently, the resistance force gently increases as the second damping part starts to function.

A second embodiment of the present invention includes a first damping part and a second damping part. However, in the second embodiment, the first damping part produces a gradually increasing resistance force as the torsional angle becomes larger to damp torsional vibration in the first displacement range. The second damping part produces a generally constant fluid flow resistance force in the second displacement range. As the resistance force produced by the first damping part increases in the first displacement range, it approaches the larger resistance force produced by the second damping part in the second displacement range. As a result the transition between the first part resistance force and the second part resistance force is gentle and little or no shock is produced.

The resistance force produced by the first damping part can be so set as to be low when the torsional angle is small and gradually increased as the torsional angle becomes larger to come closer to the resistance force in the second damping part.

The foregoing and other objects, aspects and advantages of the present invention will become more apparent from the following detailed description.

DESCRIPTION OF THE PREFERRED EMBODIMENTS

Figure 1:
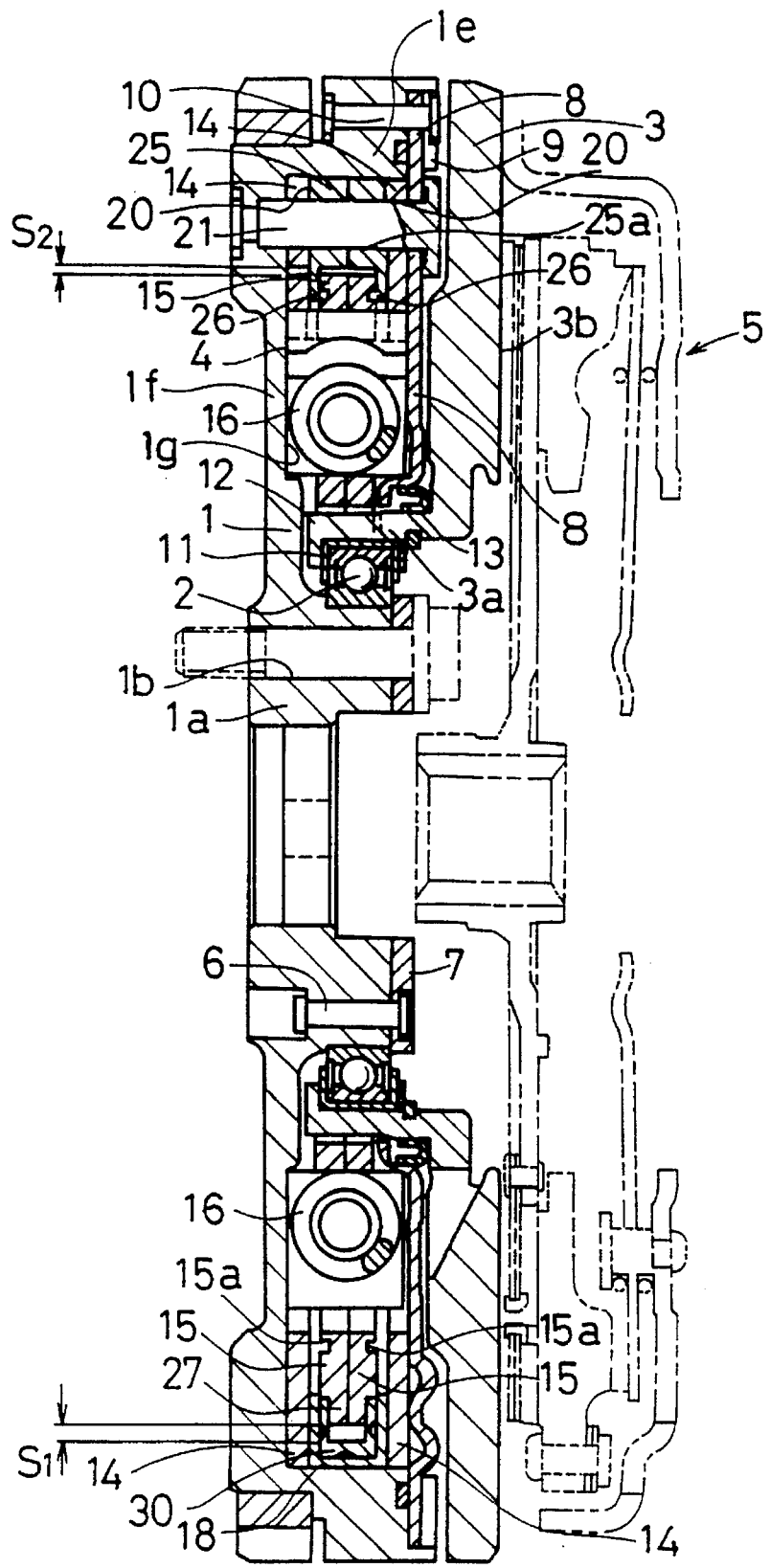
FIG. 1 is a side section view of a first embodiment of the present invention.

A flywheel assembly employing one embodiment of the present invention shown in FIG. 1 has a first flywheel 1, a second flywheel 3 rotatably supported on the first flywheel 1 through a bearing 2, and a viscous damper mechanism 4 (hereinafter merely referred to as a damper mechanism) disposed between the first flywheel 1 and the second flywheel 3 The first flywheel 1 is fixed to an end of a crankshaft of an engine (not shown), and a clutch 5 (shown in phantom) is mounted on the second flywheel 3.

The first flywheel 1 is generally a disc-shaped member, that has a boss 1a projected toward the second flywheel 3 and a radially outer annular wall 1e. In addition, an annular recess 1g is formed on a first flywheel disk portion 1f for containing the damper mechanism 4 is provided between the boss 1a and the radially outer annular wall 1e. A bearing 2 is mounted on a radially outer portion of the boss 1a. The bearing 2 is axially fixed by a plate 7 fixed to an end surface of the boss 1a by a rivet 6. The bearing 2 is one of a lubricant sealing type having sealing members on its sides. In addition, an insulating member 11 for insulating heat from the clutch 5 is disposed between the bearing 2 and a boss 3a on the second flywheel 3. The heat insulating member 11 contacts an outer ring 2a of the bearing 2 and does not abut against an inner ring of the bearing 2. A hole 1b is formed in the boss 1a to accommodate a bolt which holds the flywheel assembly to the crankshaft. In addition, a stopper plate 8 and a sub-plate 9 for mounting the damper mechanism 4 in the first flywheel 1 are disposed on an end surface of the first flywheel 1 adjacent to the second flywheel 3, and the plates 8 and 9 are fixed to an end surface of the radially outer annular wall 1e of the first flywheel 1 by a rivet 10.

Figure 2:
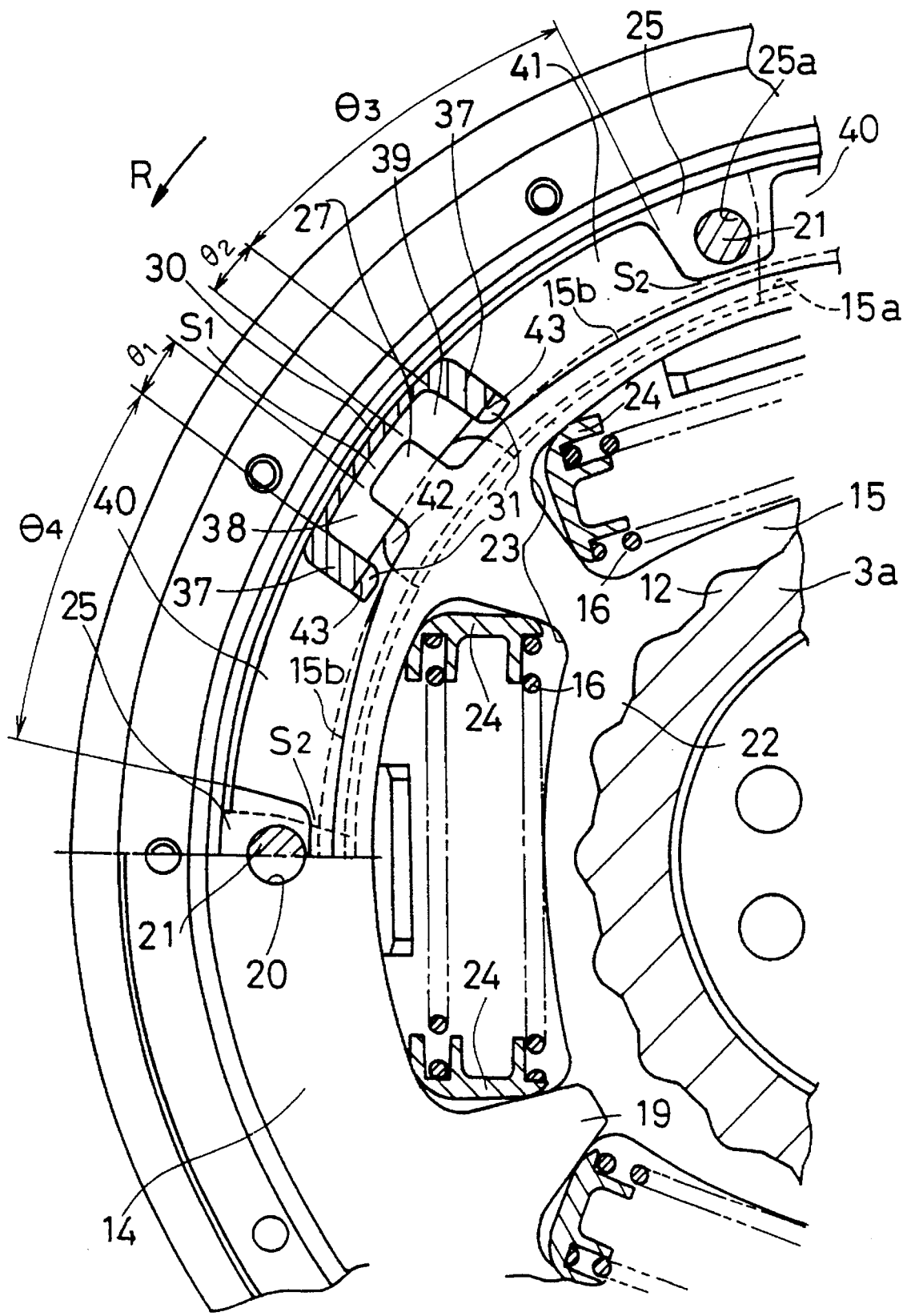
FIG. 2 is a partial front fragmented section view of the first embodiment.

The second flywheel 3 is a substantially disc-shaped member, and has a boss 3a which extends toward the first flywheel 1. The bearing 2 is mounted on a radially inner portion of the boss 3a. Wave-shaped outer teeth 12 are formed, as shown in FIG. 2, on a radially outer portion of the boss 3a. A sealing member 13 for sealing viscous fluid in the damper mechanism 4 is disposed between the boss 3a and a radially inner portion of the a plate 8. An outer surface of the second flywheel 3 on the side of the clutch 5 serves a friction surface 3b against which a friction member of a clutch disc is pressed.

The damper mechanism 4 is disposed in a viscous fluid filled space defined by the first flywheel radial portion 1e, the first flywheel disk portion 1f, the stopper plate 8, and the boss 3a of the second flywheel 3 (FIG. 1). The damper mechanism 4 includes a pair of drive plates 14 axially spaced apart from each other, but axially aligned, a pair of driven plates 15 disposed between the pair of drive plates 14, a torsion spring 16 for elastically connecting both the plates 14 and 15 to each other, and a fluid chamber housing 18.

The drive plate 14 is a ring-shaped member, and has projections 19 projected radially inward at a predetermined angle, as shown in FIG. 2. The projections 19 provide a surface for containing the torsion spring 16.

A plurality of holes 20 are formed in the drive plates 14. A fixed pin 21 is inserted into each hole 20 and extends through a corresponding hole in the first flywheel. The pair of drive plates 14, the stopper plate 8, and a weir 25 (described below) of the fluid chamber housing 18 disposed in the pair of drive plates 14 are fixed to the flywheel 1 via the pins 21, as shown in FIGS. 1 and 2.

The driven plate 15 is in a ring-shaped member, and has wave-shaped inner teeth 22 in its radially inner end, as shown in FIG. 2. The wave-shaped inner teeth 22 engage with the wave-shaped outer teeth 12 formed in the second flywheel 3, whereby the driven plate 15 and the second flywheel 3 can be integrally rotated. In addition, a plurality of window holes 23 circumferentially spaced apart, are formed in the driven plate 15. The window hole 23 corresponds to a space between the adjacent projections 19 of the drive plates 14.

Torsion springs 16 are contained in spaces formed between the window holes 23 and the space between the projections 19. As shown in FIG. 2, the torsion spring 16 abuts against both end surfaces in the circumferential direction of the window hole 23 through spring sheets 24. When the damper mechanism 4 is in a displacement free state, only radially the inner ends of the spring sheets 24 abut against the end surfaces of the window hole 23 and projections 19. Specifically, the torsion spring 16 is contained in the window hole 23 with both of its ends engaged.

Figure 4:
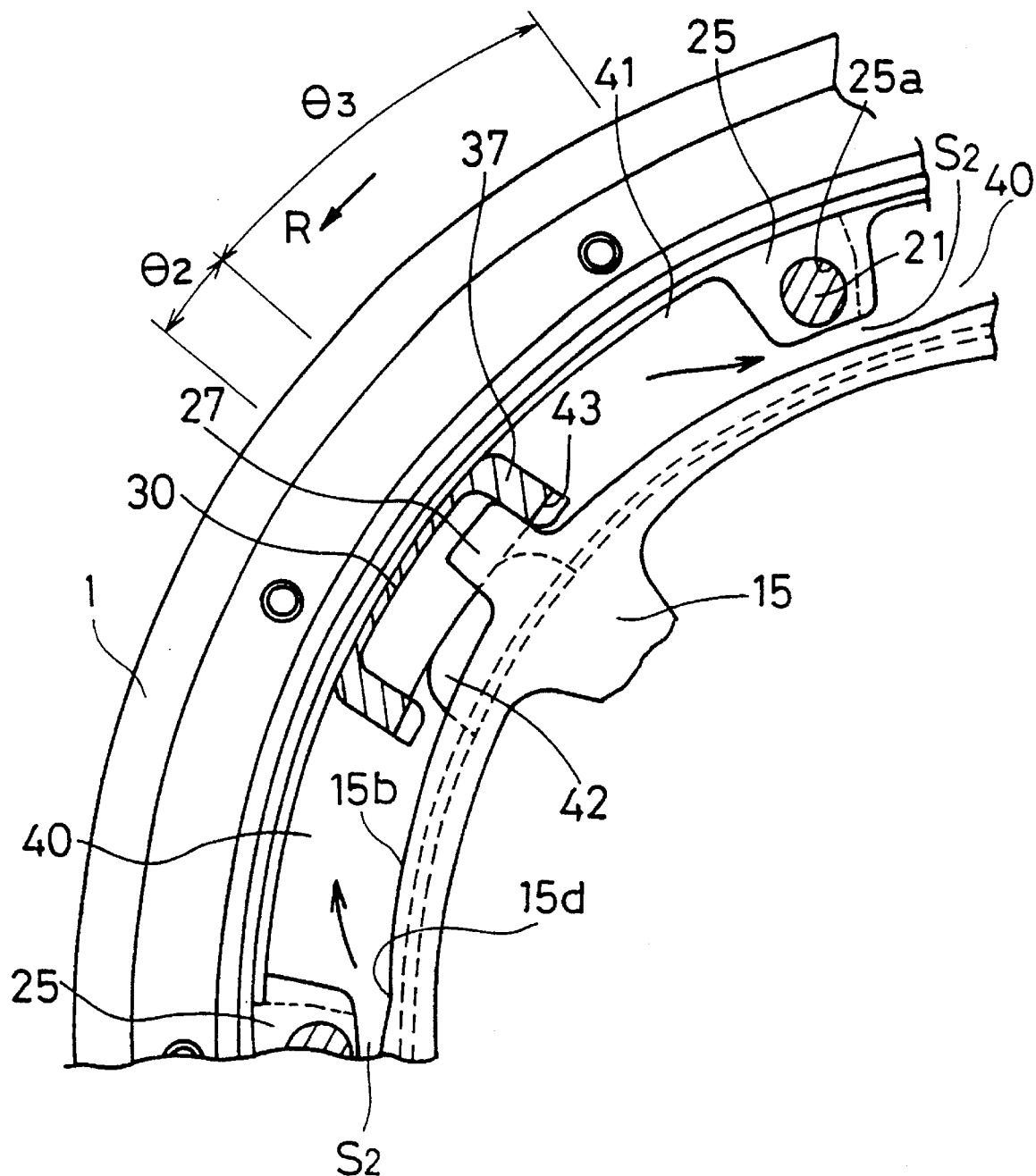
FIG. 4 is a partial section of a portion of FIG. 2, on a slightly enlarged scale, showing relative displacement of portions of the invention.

A plurality of projections 27 projecting radially outward are formed in a radially outer portion of each driven plate 15. In addition, a radially outer surface of the driven plate 15 is a deformed circle. In other words, the diameter of the driven plate 15 between the projections 27 is not constant, as indicated by the surfaces 15b in FIG. 2. For instance, the diameter is larger adjacent to the projection 27, and gradually decreases toward the middle between the adjacent projections 27. Specifically, the mid-point 15d, shown in FIG. 4, represents the point where the diameter of the surfaces 15b of the driven plate 15 is smallest, and proximate the projections 27, the diameter of the surfaces 15b is largest.

Figure 3:
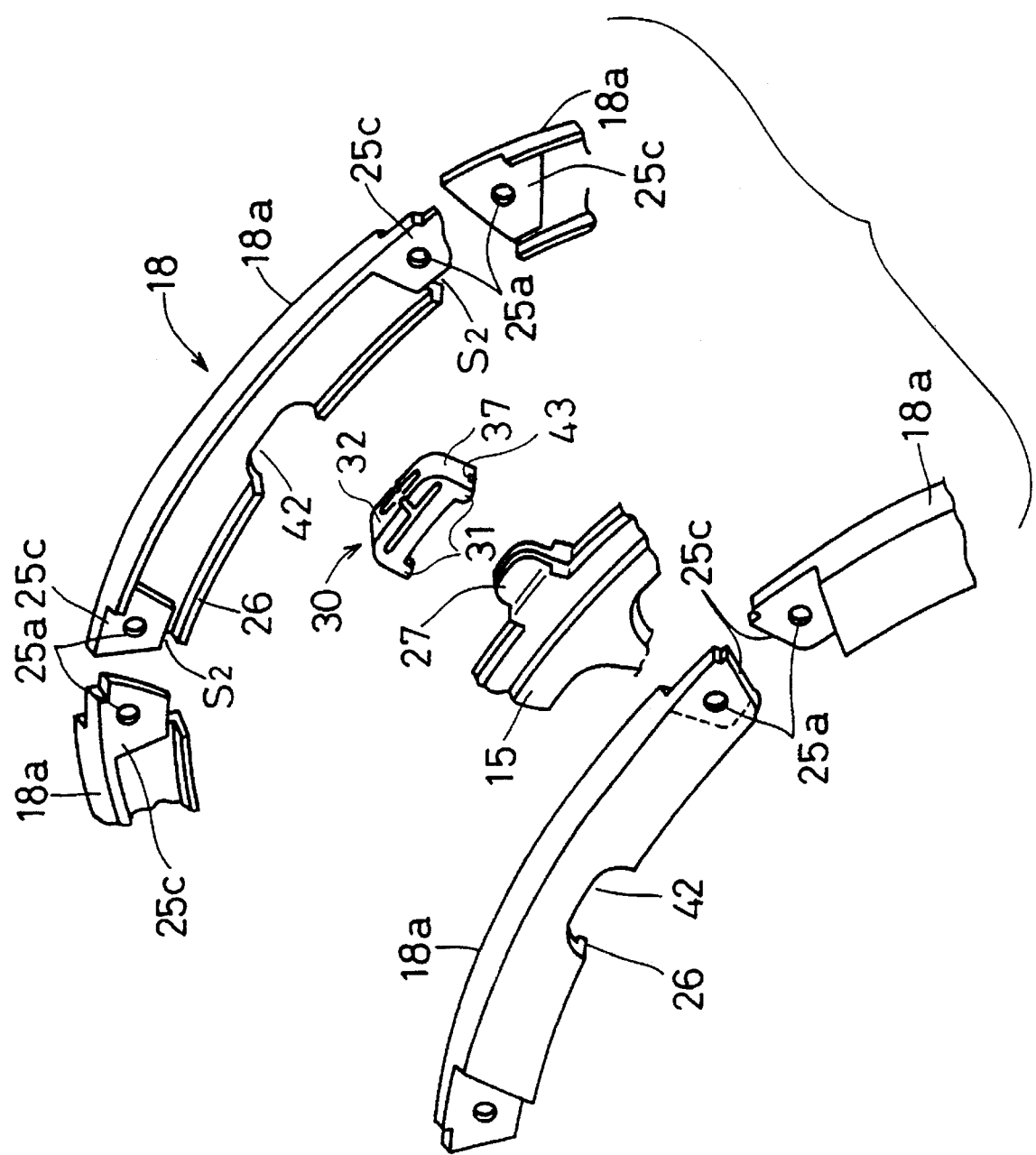
FIG. 3 is a partially exploded perspective view depicting a fluid chamber housing shown removed from the embodiment depicted in FIGS. 1 and 2.

The annular fluid chamber housing 18 interposed between the pair of drive plates 14, the projections 27 on the drive plates 15 partially extending into the housing 18, as is indicated in FIG. 3. The fluid chamber housing 18 has a plurality of weirs 25 circumferentially spaced apart from one another as shown in FIG. 2. A hole 25a is formed in each of the weirs 25. The fixed pin 21 extends through the hole 25a, as was described previously.

Each fluid chamber housing 18 includes two axial adjacent paired housing members 18a. Referring now to FIG. 3, there are five radial pairs of housing members 18a. Specifically, the fluid chamber housing 18 is constituted by five pairs of circular arc-shaped housing members 18a. Dam portions 25c of the weirs 25 are formed at each end of the housing members 18a. The corresponding dam portions 25c of the pair of adjacent housing members 18a are overlapped with each other and are coupled to each other by the fixed pin 21, whereby the fluid chamber housing 18 is assembled in an annular shape and is connected to the drive plates 14. When coupled together, overlapping dam portions 25c define the weirs 25.

A pair of annular projections 26 are formed on the radially inner end of the fluid chamber housing 18. The annular projections 26 extend, respectively, into the annular grooves 15a (FIG. 1) formed in the driven plates 15 to seal a fluid chamber.

As shown in FIG. 3, a slider 30 is formed in the shape of a box opening radially inward, and is disposed within the fluid chamber housing 18. The projection 27 of the driven plate 15 extends into the slider 30. The slider 30 is made of, for instance, resin. A radially outer wall 32 of the slider 30 is formed in a circular arc shape corresponding to the shape of the radially inner wall surface of the fluid chamber housing 18. Pairs of legs 31 are formed at the radially inner portions at both ends of the slider 30. Between each pair of legs 31 is a fluid passage opening 43. The legs 31 slidably abut against a radially outer edge of the driven plate 15.

The circumferential sides of the slider 30 are referred to hereinafter as stopper parts 37. The stopper parts 37 are circumferentially spaced apart from the projection 27 through angles θ1 and θ2 when there is no relative displacement between the first and second flywheels (FIG. 2). The projection 27 partitions a fluid chamber in the slider 30 into a first small division chamber 38 on the front side in the direction of rotation and a second small division chamber 39 on the rear side in the direction of rotation, and a sub-choke S1 causing both the division chambers 38 and 39 to communicate with each other is defined between the projection 27 and a radially inner surface of the slider 30.

Fluid supplying notches 42 are formed each housing member 18a of the fluid chamber housing 18. The fluid supplying notches 42 are generally formed in the middle between the weirs 25, and are centrally positioned with respect to the slider 30 and the projection 27 of the driven plate 15 when there is no relative displacement between the first and second flywheels.

Referring now to FIG. 4, a main choke S2 is formed between a radially inner edge of the weir 25 and a radially outer edge of the driven plate 15 and allows adjacent large division chambers 40 and 41 to communicate with each other.

The flow passage cross-sectional area of the main choke S2 is larger than the flow passage cross-sectional area of the sub-choke S1. Moreover, the radially outer end surface of the driven plate 15, being a deformed circle with a variable radius as described above, is such that the flow passage cross-sectional area of the main choke S2 is largest when there is no relative displacement between the first and second flywheels 1 and 3. The size of the main choke S2 gradually decreases as the rotary forces cause relative displacement of the two flywheels 1 and 3, thus producing a larger resistance force as the weir 25 is circumferentially rotated.

Description is now made of operations of the flywheel assembly according to the above described embodiment.

If torsional torque is produced, the drive plates 14 are rotated forward in the direction of rotation or backward in the direction of rotation relative to the driven plates 15. Since the torsion spring 16 is compressed with both its ends partially pressed against the window hole 23 in a range of small torsional angle, the viscous damper mechanism 4 exhibits small torsional rigidity. If the torsional angle is increased, the torsion spring 16 is compressed with both its ends fully pressed against the window hole 23, so that the damper mechanism 4 exhibits large torsional rigidity.

It is assumed that in a state where the projection 27 does not abut against the stopper part 37 of the slider 30 as shown in FIG. 2, the first flywheel 1 is rotated in the direction of rotation R, for example, relative to the driven plate 15. In this case, the housing 18 and the slider 30 are similarly moved in the direction of rotation R. Consequently, the second small division chamber 39 is reduced in size and the first small division chamber 38 expands. As this occurs, fluid in the second small division chamber 39 starts to flow through the fluid supplying notch 42. Therefore, a slight resistance force is only produced in this case.

The angles of relative displacement shown in FIG. 2, angles θ1 and θ2, are hereinafter defined as a first range of relative displacement. In other words, each angle is the first range of displacement of the first flywheel with respect to the second flywheel, depending upon the direction of displacement. A second range of rotational displacement is also depicted in FIG. 2, the second range being defined by either angle θ3 or θ4 depending upon the direction of rotational displacement. The relative displacement of the two flywheels typically extends first in the first range, and further displacement extends into the second larger range. The fluid flow resistance force in the first range can be fixed at a specific amount in dependence upon the size of the opening 43, the length of the projection 27 and/or the fluid supplying notch 42. Therefore the force provided by the choke S1 may be adjusted to suit a specific application.

During displacement in the first range, if the stopper part 37 abuts against the projection 27 due to the increase in the displacement angle, a slider opening 43 closes due to the part 37 contacting the projection 27, whereby the sub-choke S1 is closed (see FIG. 4). Further, the fluid supplying notch 42 is also closed by the projection 27. Once the notch 42 and the sub-choke S1 are closed, any further displacement of the flywheel extends into the second displacement range and the choke S2 provides fluid flow resistance.

In the second displacement range θ3, as shown in FIG. 4, the first flywheel 1 and the housing 18 are displaced in the direction R relative to the driven plate 15 and the slider 30. As a result, fluid in the second large division chamber 41 flows into the first large division chamber 40 on the rear side in the direction of rotation through the main choke S2. Since initially the flow passage cross-sectional area of the main choke S2 is approximately the same as flow passage cross-sectional area of the sub-choke S1, a relatively small resistance force is produced. If the displacement angle is further increased beyond what is shown in FIG. 4, the flow passage cross-sectional area of the main choke S2 is gradually decreased due to the increase in diameter of the member 15 as the projection 27 approaches the weir 25, thus producing a larger resistance force to the flow of fluid between chambers 40 and 41.

Figure 5:
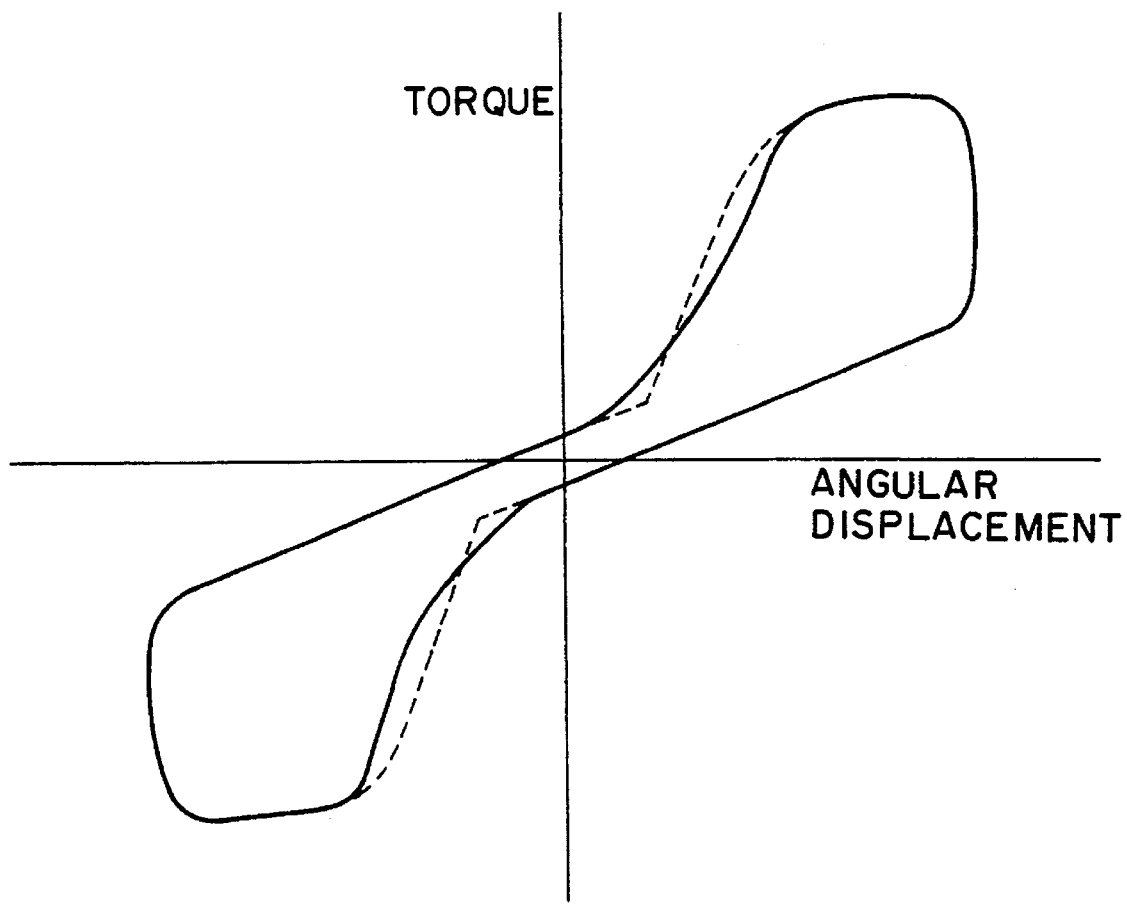
FIG. 5 is a graph showing the dynamic displacement responses of the invention in response to relative rotational displacement of portions of the first embodiment of the invention.

Dynamic properties in a torsional characteristic curve of the flywheel assembly of the foregoing construction are shown in FIG. 5. In FIG. 5, a dotted line indicates the conventional example, and a solid line indicates the embodiment of the present invention. As apparent from FIG. 5, a resistance force is gently changed when the main choke S2 starts to function immediately after the sub-choke S1 has functioned, whereby a shock does not easily occur. Since the resistance force is increased as the relative angle of the choke S2 is increased, it is possible to ensure a sufficient resistance force to cope with low-frequency vibration in a high speed region. In addition, the timing at which the main choke S2 starts to function is advanced to ensure a larger resistance force by, for example, decreasing the circumferential width of the slider 30, increasing the circumferential width of the projection 27 and narrowing the fluid supplying notch 42.

In a second embodiment, wherein many of the elements present in the first embodiment are also present, a radially outer surface of a driven plate 15c has a generally constant diameter between the projections 27. The main choke S2 therefore has a generally constant size irrespective of the torsional angle.

Figure 7:
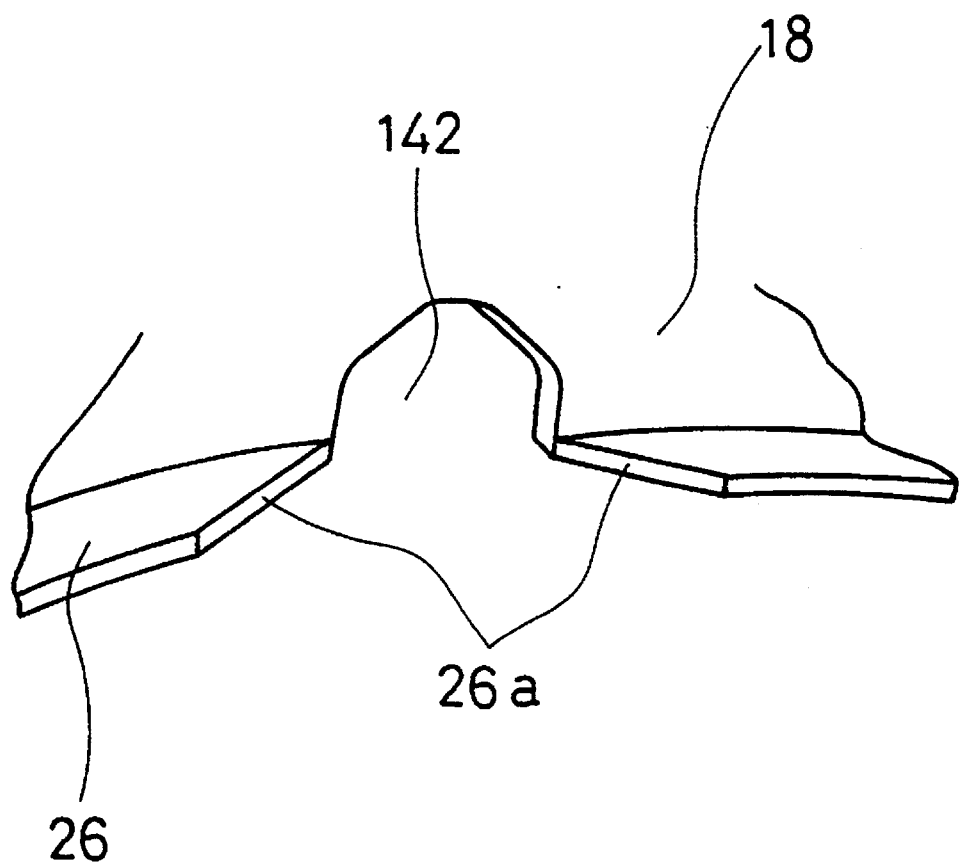
FIG. 7 is a partially enlarged view of a portion of the embodiment depicted in FIG. 6, showing a fluid chamber housing.

As shown in FIG. 7, a fluid supplying notch 142 formed between respective weirs 25 of a fluid chamber housing 18 is formed with a generally symmetrical inverted "V" shape. The circumferential width of the notch 142 is made smaller than the width of the notch in the previous embodiment. In addition, a tapered notch 26a is formed in an annular projection 26 connecting with the notch 142.

The other elements in the second embodiment are generally as described in the previous embodiment and hence, the description thereof is not repeated.

Description is made of the production of viscosity by the movement of fluid when torsional torque is produced.

Figure 6:
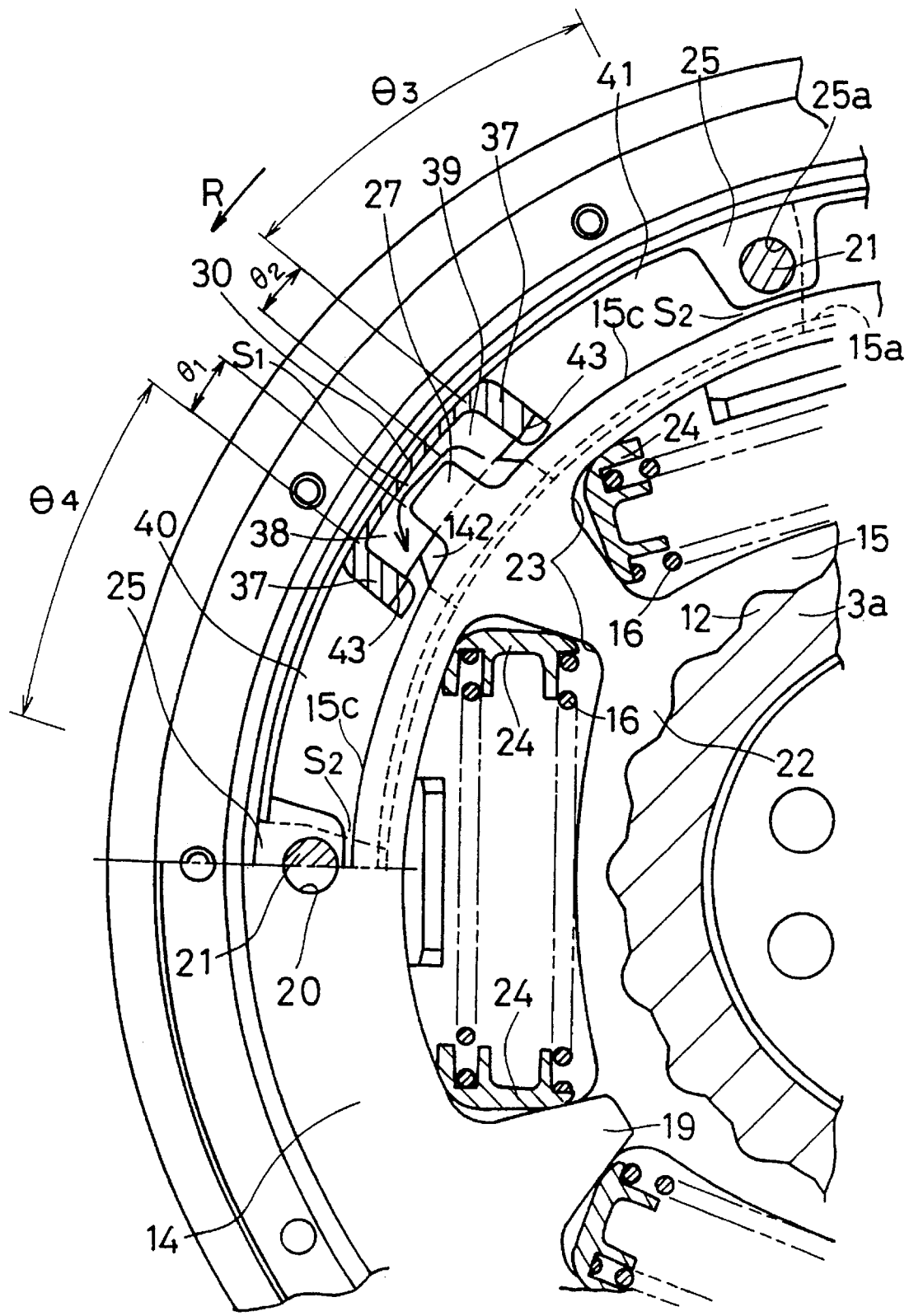
FIG. 6 is a section similar to FIG. 2, showing a second embodiment of the invention.

It is assumed that in a state where a projection 27 does not abut against the stopper part 37 of the slider 30 as shown in FIG. 6, a first flywheel 1 is rotated in the direction of rotation R, for example, relative to the driven plate 15. In this case, the housing 18 and the slider 30 are similarly moved in the direction of rotation R. Consequently, a second small division chamber 39 is compressed to contract and at the same time, a first small division chamber 38 expands. As a result, fluid in a second small division chamber 39 flows inward through the fluid supplying notch 142 formed in the housing 18, whereby a slight resistance force is only produced.

Figure 8:
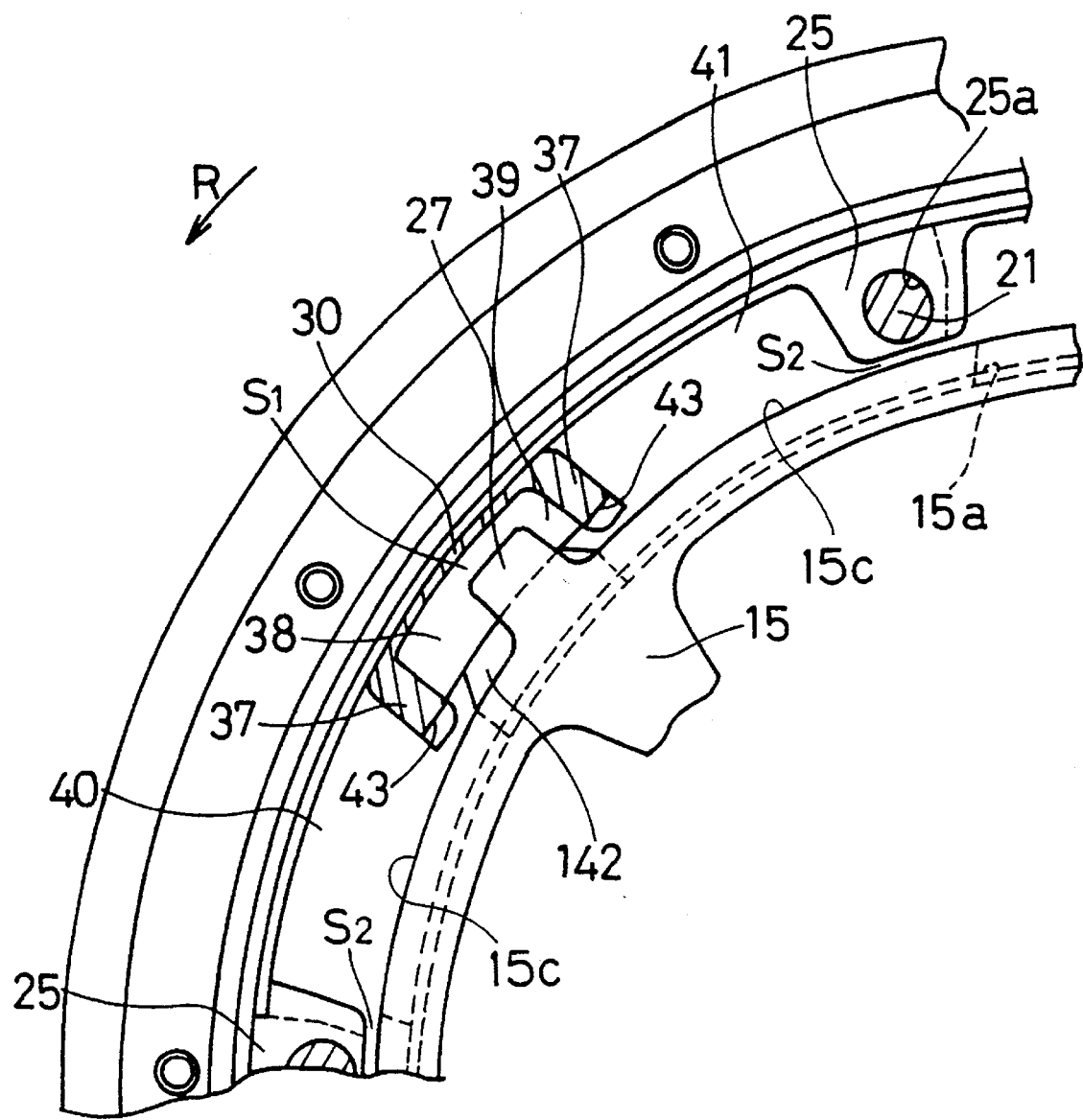
FIG. 8 is a slightly enlarged portion of FIG. 6, showing one operating state of the second embodiment and depicting relative displacement between several portions of the present invention.
Figure 9:
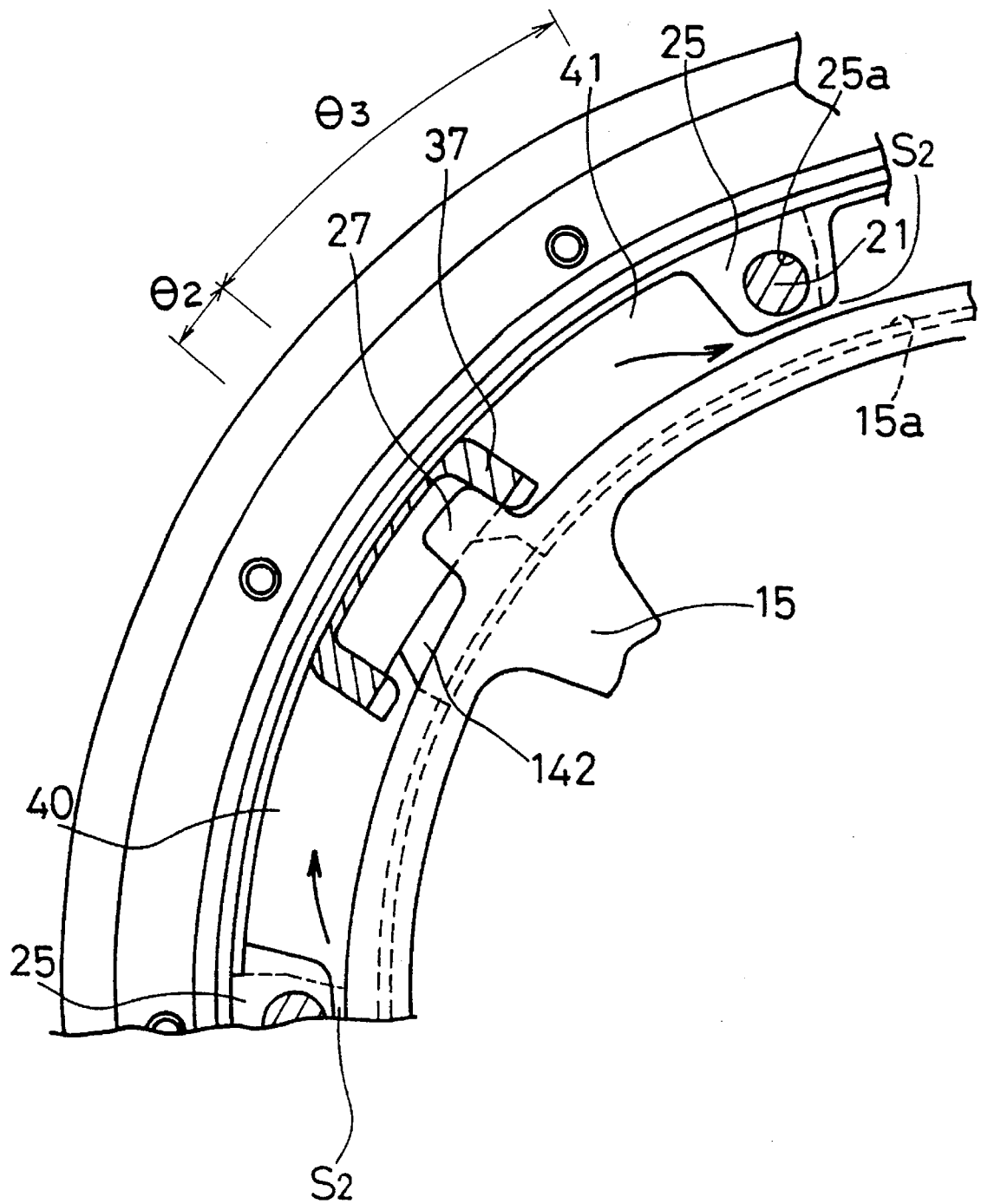
FIG. 9 is a view similar to FIG. 8, showing another operating state of the second embodiment wherein further relative displacement is depicted.

If the torsional angle is increased, the rear stopper part 37 of the slider 30 approaches the projection 27, and the fluid supplying notch 142 opening into the second small division chamber 39 is gradually decreased by the projection 27, as shown in FIG. 8. In this instance, a large portion of the fluid supplying notch 142 is open to the chamber 38, as is the tapered the tapered notch 26a. Further, the portion of the fluid supplying notch 142 open to the division chamber 39 is gradually decreased. As a result, fluid flow resistance from the chamber 39 to the chamber 38 is restricted, or put another way, the force produced is gradually increased. Further, the resistance force produced by the projection 27 and the slider 30 is close to the resistance force produced by the main choke S2.

Figure 10:
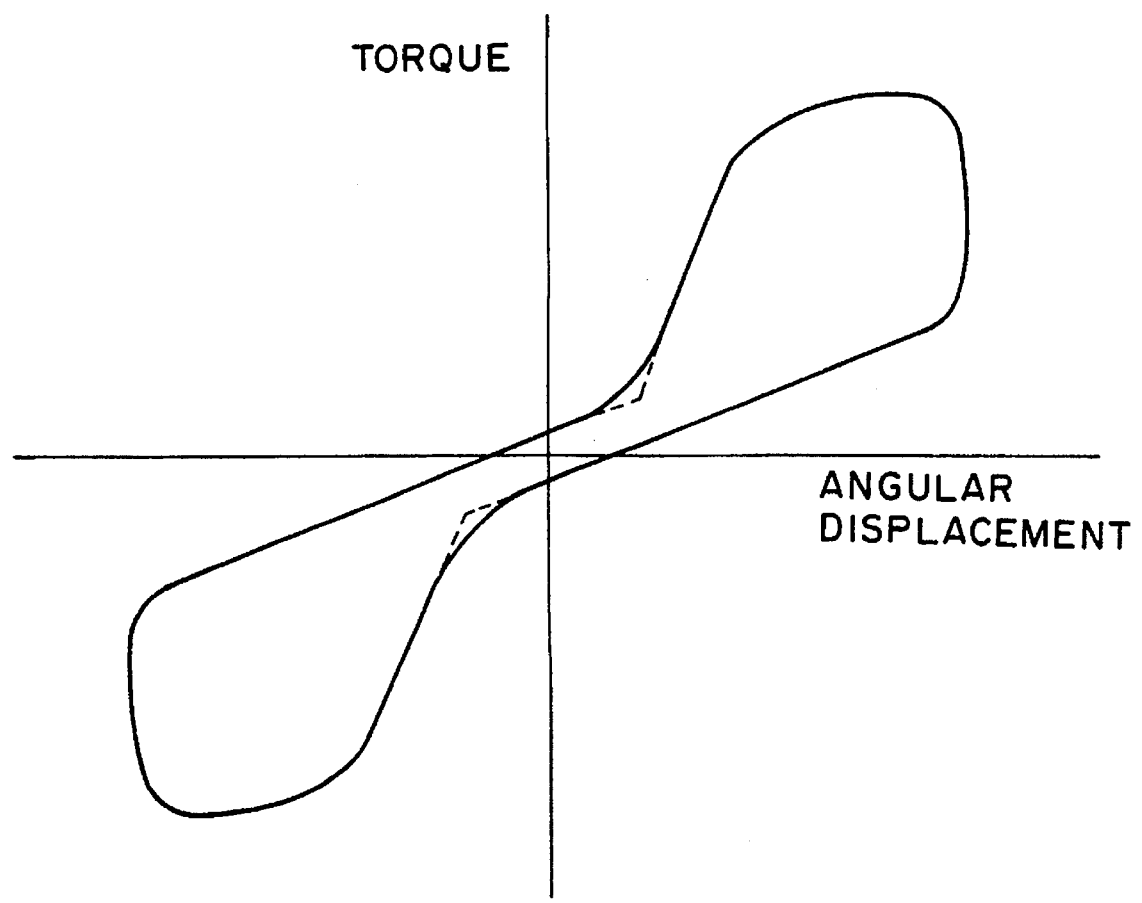
FIG. 10 is a graph showing the dynamic response of the second embodiment.

Dynamic properties of the present embodiment are shown in FIG. 10. In FIG. 10, a dotted line indicates the dynamic properties of the conventional example, while a solid line indicates the dynamic properties of the present embodiment. In the case of the transition from the resistance force of the first magnitude to the resistance force of the second magnitude, the resistance force is gently changed, whereby a shock does not easily occur in that portion.

Various details of the invention may be changed without departing from its spirit nor its scope. Furthermore, the foregoing description of the embodiment according to the present invention is provided for the purpose of illustration only, and not for the purpose of limiting of the invention as defined by the appended claims and their equivalents.

What is claimed is:

1. A viscous dampening device comprising:

a first flywheel;

a second flywheel coupled to said first flywheel for limited rotary displacement, said first and second flywheels at least partially confining an annular chamber therebetween, at least one fluid chamber housing disposed within said annular chamber fixed to said first flywheel, said fluid chamber housing having opposing walls and a tapered opening formed in at least one of said walls, said fluid chamber housing defining a plurality of fluid chambers, fluid being flowable between said fluid chambers in response to relative rotary displacement between said flywheels, relative displacement between said flywheels defined by rotary movement in first and second motion ranges, the second range including rotary displacement greater than the first range;

a first rotary member coupled to said first flywheel having a plurality of projections at least partially extending into said annular chamber;

a second rotary member coupled to said second flywheel having a plurality of projections at least partially extending into said annular chamber, and a plurality of radial portions between said projections, said first and second rotary member projections at least partially defining said fluid flow chambers;

a slider having a hollow interior disposed for limited movement within said chamber housing adjacent to said second rotary member wherein at least one of said second rotary member projections extends into the hollow interior of said slider, an inner surface of said slider and said projection forming a first choke, said slider and said projection forming first and second fluid sub-chambers within the hollow interior of said slider, said slider and said projection being proximate said tapered opening in the absence of relative displacement between said flywheels, said tapered opening selectively allowing fluid communication between said first and second fluid sub-chambers, and said projection gradually inhibiting fluid flow between said first and second fluid chambers via said tapered opening as said projection moves within said slider in response to rotary displacement between said flywheels in said first motion range, said tapered opening providing said first choke assembly with a variable fluid flow resistance between said first and second fluid sub-chambers in response to displacement between said flywheels in said first motion range;

a second choke assembly disposed between a third chamber and a fourth chamber defined in said fluid chamber housing, said third and fourth chambers having a generally constant fluid flow resistance between said third and fourth chambers greater than the variable fluid flow resistance of said first choke in response to relative displacement between said flywheels within said second motion range, wherein at least one of said first rotary member projections and at least one of said radial portions of said second rotary member defining said second choke:

wherein said variable fluid flow resistance of said first choke gradually increases as the relative displacement between said flywheels increases within said first motion range defining a gradual transition between said variable fluid flow resistance and said constant fluid flow resistance of said second choke.

2. A viscous dampening device for use in a flywheel assembly comprising:

a first flywheel;

a second flywheel coupled to said first flywheel for limited rotary displacement, said flywheels at least partially defining an annular chamber therebetween, a plurality of fluid chambers being defined within said annular chamber, fluid being flowable between said fluid chambers in response to relative rotary displacement between said flywheels, relative displacement of said flywheels defined by angular movement in first and second motion ranges, the second motion range including rotary displacement greater than the displacement within first range;

a first rotary member coupled to said first flywheel having a plurality of projections at least partially extending into said annular chamber;

a first choke assembly disposed between a first and second of said chambers having a generally constant fluid flow resistance between said first and second chambers in response to displacement between said flywheels in said first motion range;

a second choke assembly disposed between a third and fourth of said chambers having a variable fluid flow resistance between said third and fourth chambers greater than the resistance of said first choke in response to relative displacement between said flywheels in said second motion range;

a second rotary member coupled to said second flywheel having a plurality of projections at least partially extending into said annular chamber, and a plurality of radial portions between said projections, said first and second rotary member projections at least partially defining said fluid flow chambers, at least one of said first rotary member projections and at least one of said radial portions of said second rotary member defining said second choke;

wherein a plurality of said radial portions are defined on a circumferential surface of said second rotary member on each circumferential side of each of said second rotary member projections, each of said radial portions having a generally arcuate shaped variable diameter such that proximate to each of said second rotary member projections, a diameter of said radial portions is greater than a diameter of said radial portions at a mid-point between said second rotary member projections;

wherein said variable fluid flow resistance of said second choke gradually increases as the relative displacement between said flywheels increases within said second motion range and defines a gradual transition between said constant fluid flow resistance and said variable fluid flow resistance.

3. A viscous dampening device as set forth in claim 2 further comprising:

a slider having a hollow interior disposed for limited movement within said annular chamber adjacent to said second rotary member wherein at least one of said second rotary member projections extends into the hollow interior of said slider, an inner surface of said slider and said projection forming said first choke, and said slider and said projection forming said first and second fluid chambers.

\* \* \* \* \*